(12) United States Patent
Lee

(10) Patent No.: US 11,482,751 B2
(45) Date of Patent: Oct. 25, 2022

(54) BATTERY MODULE, BATTERY PACK COMPRISING SUCH BATTERY MODULE, AND VEHICLE COMPRISING SUCH BATTERY PACK

(71) Applicant: LG Chem, Ltd., Seoul (KR)

(72) Inventor: Bo-Hyun Lee, Daejeon (KR)

(73) Assignee: LG Energy Solution, Ltd.

( * ) Notice: Subject to any disclaimer, the term of this patent is extended or adjusted under 35 U.S.C. 154(b) by 79 days.

(21) Appl. No.: 16/981,543

(22) PCT Filed: Aug. 26, 2019

(86) PCT No.: PCT/KR2019/010869
§ 371 (c)(1),
(2) Date: Sep. 16, 2020

(87) PCT Pub. No.: WO2020/055005
PCT Pub. Date: Mar. 19, 2020

(65) Prior Publication Data
US 2021/0020879 A1    Jan. 21, 2021

(30) Foreign Application Priority Data
Sep. 13, 2018 (KR) .................. 10-2018-0109836

(51) Int. Cl.
*H01M 10/6552* (2014.01)
*H01M 10/6569* (2014.01)
(Continued)

(52) U.S. Cl.
CPC ......... *H01M 50/20* (2021.01); *H01M 10/653* (2015.04); *H01M 10/6552* (2015.04);
(Continued)

(58) Field of Classification Search
CPC ............ F28D 15/0233; F28D 15/0275; H01M 10/617; H01M 10/625; H01M 10/647;
(Continued)

(56) References Cited

U.S. PATENT DOCUMENTS

2008/0113229 A1    5/2008  Oh
2010/0275619 A1*  11/2010 Koetting ............. H01M 10/633
                                                       62/115
(Continued)

FOREIGN PATENT DOCUMENTS

DE    102015219536 A1    4/2017
EP       2187473 A1    5/2010
(Continued)

OTHER PUBLICATIONS

International Search Report for PCT/KR2019/010869 dated Dec. 27, 2019; 3 pages.
(Continued)

*Primary Examiner* — Lingwen R Zeng
(74) *Attorney, Agent, or Firm* — Lerner, David, Littenberg, Krumholz & Mentlik, LLP

(57) ABSTRACT

A battery module includes a module case, a battery cell assembly that is received in the module case, a heat sink mounted below the module case, and a heat pipe member mounted inside an upper side of the module case. The battery cell assembly includes battery cells, each of which has an electrode lead drawn to one or two sides thereof. The battery cells are stacked along a horizontal direction of the module case such that an edge of each of the battery cells not having an electrode lead is oriented downwardly facing the heat sink. The heat pipe member includes an evaporator and a condenser, the evaporator being formed on a side of the electrode leads of the battery cells, and the condenser being in contact with an inner surface of the module case.

11 Claims, 15 Drawing Sheets

(51) Int. Cl.
*H01M 10/653* (2014.01)
*H01M 50/20* (2021.01)
*H01M 50/54* (2021.01)
*H01M 10/647* (2014.01)
*H01M 50/289* (2021.01)
*H01M 10/625* (2014.01)
*H01M 50/211* (2021.01)
*H01M 50/249* (2021.01)
*H01M 50/224* (2021.01)
*H01M 50/242* (2021.01)
*H01M 10/6551* (2014.01)
*H01M 10/617* (2014.01)
*H01M 50/486* (2021.01)
*F28D 15/02* (2006.01)
*H01M 50/278* (2021.01)

(52) U.S. Cl.
CPC ....... H01M 10/6569 (2015.04); H01M 50/54 (2021.01); *F28D 15/0233* (2013.01); *F28D 15/0275* (2013.01); *H01M 10/617* (2015.04); *H01M 10/625* (2015.04); *H01M 10/647* (2015.04); *H01M 10/6551* (2015.04); *H01M 50/211* (2021.01); *H01M 50/224* (2021.01); *H01M 50/242* (2021.01); *H01M 50/249* (2021.01); *H01M 50/278* (2021.01); *H01M 50/289* (2021.01); *H01M 50/486* (2021.01); *H01M 2220/20* (2013.01); *Y02E 60/10* (2013.01)

(58) Field of Classification Search
CPC ........... H01M 10/653; H01M 10/6551; H01M 10/6552; H01M 10/6569; H01M 2220/20; H01M 50/20; H01M 50/211; H01M 50/224; H01M 50/249; H01M 50/278; H01M 50/486; H01M 50/531; H01M 50/54; H01M 50/242; H01M 50/289; Y02E 60/10

See application file for complete search history.

(56) References Cited

U.S. PATENT DOCUMENTS

| | | | |
|---|---|---|---|
| 2013/0273400 A1* | 10/2013 | Musetti | H01M 10/6555 429/81 |
| 2014/0023894 A1 | 1/2014 | Jansen et al. | |
| 2014/0363719 A1 | 12/2014 | Kwak et al. | |
| 2015/0086827 A1 | 3/2015 | Sun et al. | |
| 2018/0034122 A1* | 2/2018 | Newman | H01M 10/6551 |
| 2018/0287226 A1 | 10/2018 | Yoo et al. | |

FOREIGN PATENT DOCUMENTS

| | | |
|---|---|---|
| JP | 2010123349 A | 6/2010 |
| JP | 2015528189 A | 9/2015 |
| KR | 100804702 B1 | 2/2008 |
| KR | 20140144330 A | 12/2014 |
| KR | 20160122444 A | 10/2016 |
| KR | 20170019229 A | 2/2017 |
| KR | 20170070795 A | 6/2017 |

OTHER PUBLICATIONS

Extended European Search Report including Written Opinion for Application No. 19860499.3 dated May 27, 2021, pp. 1-9.

* cited by examiner

BATTERY MODULE, BATTERY PACK COMPRISING SUCH BATTERY MODULE, AND VEHICLE COMPRISING SUCH BATTERY PACK

CROSS-REFERENCE TO RELATED APPLICATIONS

The present application is a national phase entry under 35 U.S.C. § 371 of International Application No. PCT/KR2019/010869 filed Aug. 26, 2019, which claims priority from Korean Patent Application No. 10-2018-0109836 filed on Sep. 13, 2018, the disclosures of which are incorporated herein by reference.

TECHNICAL FIELD

The present disclosure relates to a battery module, a battery pack comprising the battery module and a vehicle comprising the battery pack.

BACKGROUND ART

Currently, commercially available secondary batteries include nickel-cadmium batteries, nickel-hydrogen batteries, nickel-zinc batteries, lithium secondary batteries and the like, and among them, lithium secondary batteries have little or no memory effect, and thus they are gaining more attention than nickel-based secondary batteries for their advantages that recharging can be done whenever it is convenient, the self-discharge rate is very low and the energy density is high. Recently, secondary batteries have not only been commonly applied to small devices such as mobile electronic devices, but universally applied to medium- and large-sized devices including electric vehicles (EVs) that are driven by an electrical driving source such as plug-in electric vehicles (PEVs) and plug-in hybrid electric vehicles (PHEVs) and energy storage systems (ESSs).

A unit secondary battery cell, or a unit battery cell usually has a working voltage of about 2.5V~4.5V. Accordingly, in case a higher output voltage is required, a plurality of battery cells may be connected in series to form a battery pack. A battery pack may be formed by connecting a plurality of battery cells in parallel according to the charge/discharge capacity required for the battery pack. Accordingly, the number of battery cells included in the battery pack may be variously set depending on the output voltage or the charge/discharge capacity required. Particularly, pouch-type battery cells are commonly used in battery packs of medium- and large-sized devices due to their advantage of being easy to stack and lightweight.

FIG. 1 shows a general pouch-type battery cell.

The battery cell 10 shown in FIG. 1 has a structure in which an electrode assembly 14 having an electrode lead 12 connected thereto is received in a pouch case 16 together with an electrolyte solution, and the pouch case 16 is sealed through a sealing part S. Part of the electrode lead 12 is exposed through the pouch case 16, and the exposed electrode lead 12 is electrically connected to a device in which the battery cell 10 is mounted, or is used to electrically connect the battery cells 10.

To form a battery pack by connecting the battery cells 10 in series/in parallel, generally, a battery cell assembly including at least one battery cell 10 is made and used to form a battery module, and then other components are added to at least one battery module.

In the battery module, with the increasing battery capacity required, the importance of technology for efficiently cooling heat generated from the battery cells 10 is gradually increasing, and there is a tendency to prefer an edge cooling method using a heat sink mounted on the bottom of the module case of the battery module.

The edge cooling type battery module is cooled by transferring heat generated from the battery cells to the heat sink on the bottom of the module case, but does not have a heat transfer pathway to the top of the module case. Accordingly, the conventional battery module has a large temperature difference between top and bottom of the battery cell assembly.

Particularly, recently, the development trend of battery modules for electric vehicles has moved toward increasing the length L of the battery cell 10. When only the lower part LP of the battery cell 10 is cooled through an edge cooling method, as the electric current becomes concentrated near the electrode lead 12, the long battery cell 10 has a temperature increase at the top left/right ends UP of the battery cell 10, and as a consequence, there is a large temperature difference between different locations in the same battery cell 10. Accordingly, there are safety and durability problems of the battery module including the same, and their solutions are necessary.

DISCLOSURE

Technical Problem

Accordingly, the present disclosure is designed to solve the above-described problem, and the present disclosure is directed to providing a battery module with a reduced temperature difference between top and bottom of a battery cell assembly, a battery pack comprising the battery module and a vehicle comprising the battery pack.

These and other objects and advantages of the present disclosure will be understood by the following description and will be apparent from the embodiments of the present disclosure. Further, it will be readily understood that the objects and advantages of the present disclosure are realized by the means set forth in the appended claims and combinations thereof.

Technical Solution

To achieve the above-described object, the present disclosure provides a battery module including a module case, a battery cell assembly that is received in the module case, the battery cell assembly including battery cells, wherein each of the battery cells has an electrode lead drawn to one or two sides, the battery cells are stacked along a horizontal direction of the module case such that an edge where the electrode lead is not drawn is placed down, a heat sink mounted below the module case, facing the edges of the battery cells, and a heat pipe member mounted inside an upper side of the module case, wherein the heat pipe member includes an evaporator and a condenser, and the evaporator is formed on a side of the electrode leads of the battery cells, and the condenser is in contact with an inner surface of the module case.

The battery module may further include a thermally conductive adhesive interposed between an inner lower surface of the module case and a lower side of the battery cell assembly.

The module case may further include a top plate that covers an upper side of the battery cell assembly, a bottom plate that is disposed opposite the top plate and covers a lower side of the battery cell assembly, a pair of side plates that are coupled to the top plate and the bottom plate and disposed on two sides of the battery cell assembly, a first opening and a second opening that are open to two sides of lengthwise direction of the battery cells, a front cover that is coupled to the first opening of the module case and covers a front side of the battery cell assembly, and a rear cover that is coupled to the second opening of the module case and covers a rear side of the battery cell assembly.

The battery module may further include a top cover between the upper side of the module case and the battery cell assembly, wherein the heat pipe member is mounted in the top cover.

In this instance, the heat pipe member may be inserted into the top cover. The heat pipe member may be assembled into the top cover by an interference fit structure.

The heat pipe member may include a plurality of strip-shaped heat pipes. In the heat pipe member, the evaporator may be in a shape of a plurality of strips, and the condenser may use an integrated heat pipe module.

The present disclosure further provides a battery pack including at least one battery module according to the present disclosure, and a pack case that packages the at least one battery module.

The present disclosure further provides a vehicle including at least one battery pack according to the present disclosure.

Advantageous Effects

According to an aspect of the present disclosure, it is possible to effectively transfer heat from the upper side of the battery cell assembly to the module case. Accordingly, a structure that cools the lower side of the battery cell assembly through a thermally conductive adhesive or a heat sink can also achieve cooling through the upper side of the battery cell assembly. According to the present disclosure, since cooling through the upper side of the battery cell assembly is possible, it is possible to reduce the occurrence of a temperature difference between top and bottom of the battery cell. Even when the cooling performance through the lower side of the battery cell assembly is insufficient, it is possible to prevent the heat accumulation in the battery module through improved cooling performance through the upper side of the battery cell assembly.

According to another aspect of the present disclosure, the heat pipe member is mounted on the top cover, thereby firmly fixing the heat pipe member, preventing the movement to the incorrect location caused by impacts and maintaining the battery module more firmly.

According to still another aspect of the present disclosure, there is provided a battery module using a tubular rectangular monoframe type module case, not a cell cartridge as conventionally. Due to not using the cell cartridge to which the edge of the battery cell is inserted and fixed by press-fit as conventionally, the allowance in the design of the entire battery module increases, and it is possible to solve the conventional problem with the transmission, to the edge of the battery cell, of impacts or vibration that may occur during mounting when the edge of the battery cell is inserted into the cell cartridge. The battery module and the battery pack can protect the battery cell from external vibration very well, and thus they are advantageous in the application of vehicles that are frequently exposed to external vibration.

According to yet another aspect of the present disclosure, assembly of the battery module can be easily performed, resulting in high process efficiency. Additionally, the battery module may not include a sealing component such as an O-ring, a cooling component such as a cooling fin, or a reinforcing or fixing component such as a cartridge, reducing the number of components of the battery module. Accordingly, according to this aspect of the present disclosure, it is possible to reduce the production cost and time and the weight, thereby improving productivity of the battery module.

As described above, the present disclosure can provide a simple and compact battery module that does not make the entire structure complex, does not occupy a large space and reduces a temperature difference between the top and bottom of the battery cell assembly. Further, the present disclosure can provide a battery pack including the battery module and a vehicle including the battery pack.

Particularly, according to the present disclosure, the battery module configured to cool the bottom of the battery cell through an edge cooling method can reduce a temperature difference between different locations in the same battery cell caused by the increasing length of the battery cell in the battery module. Accordingly, it is possible to improve the safety and durability of the battery module, the battery pack and the vehicle including the same.

BRIEF DESCRIPTION OF DRAWINGS

The accompanying drawings illustrate a preferred embodiment of the present disclosure, and together with the detailed description of the present disclosure described below, serve to provide a further understanding of the technical aspects of the present disclosure, and thus the present disclosure should not be construed as being limited to the drawings.

FIG. 7b is a top view of a heat pipe member assembled into the top cover of FIG. 7a.

MODE FOR DISCLOSURE

Figure 1:
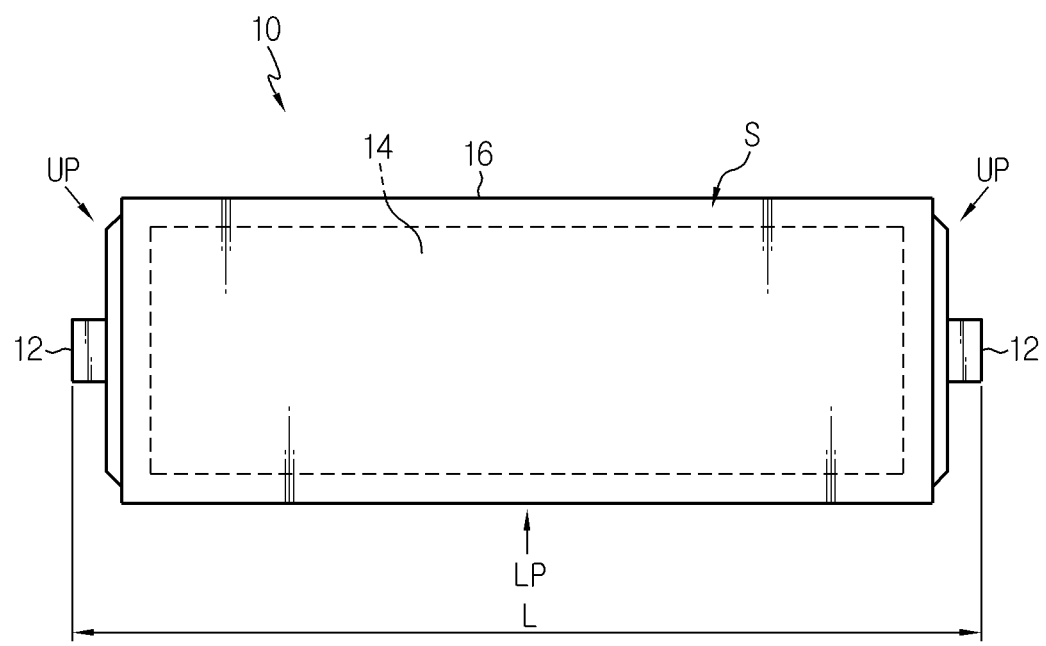
FIG. 1 shows a general pouch-type battery cell.

Hereinafter, the preferred embodiments of the present disclosure will be described in detail with reference to the accompanying drawings. Prior to the description, it should be understood that the terms or words used in the specification and the appended claims should not be construed as limited to general and dictionary meanings, but rather interpreted based on the meanings and concepts corresponding to the technical aspects of the present disclosure on the basis of the principle that the inventor is allowed to define terms appropriately for the best explanation.

Therefore, the embodiments described herein and illustrations shown in the drawings are just a most preferred embodiment of the present disclosure, but not intended to fully describe the technical aspects of the present disclosure, so it should be understood that other equivalents and modifications could be made thereto at the time the application was filed.

Figure 2:
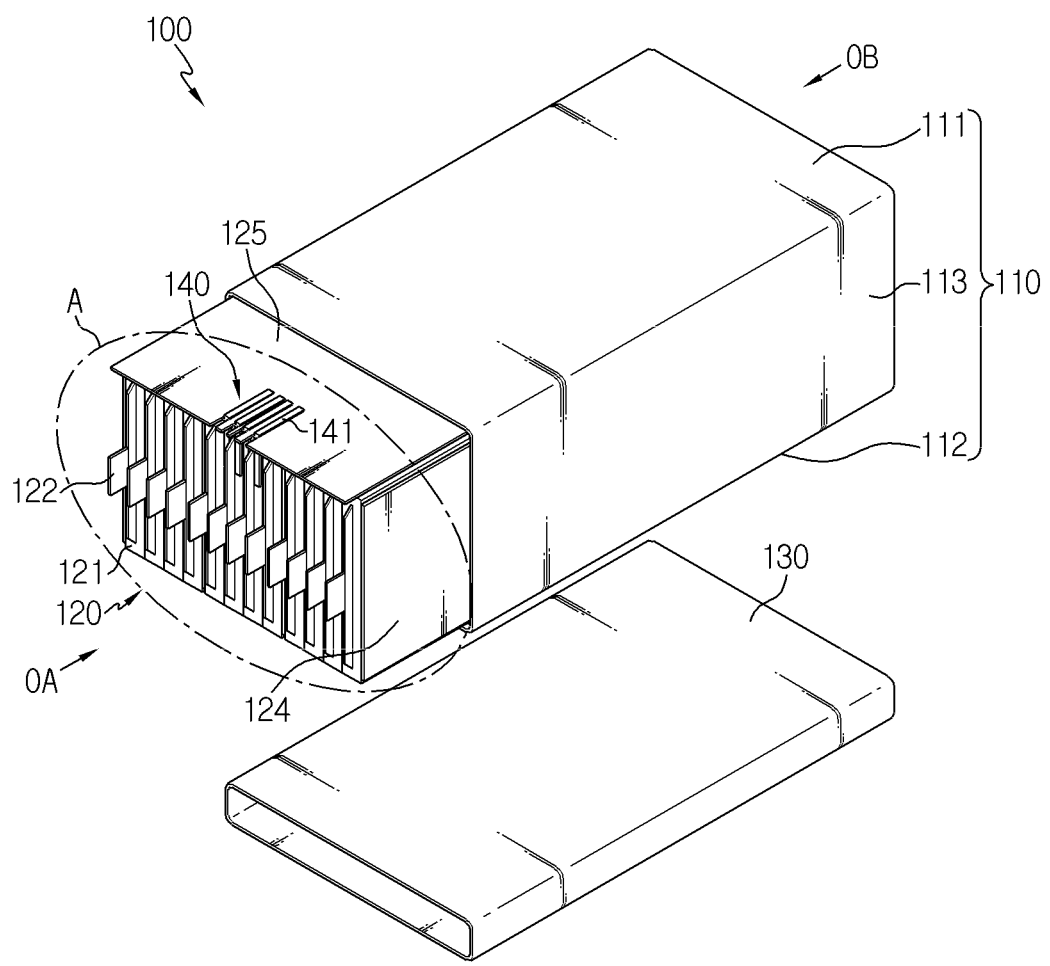
FIG. 2 is a partial cutaway perspective view illustrating a battery module according to an embodiment of the present disclosure.
Figure 3:
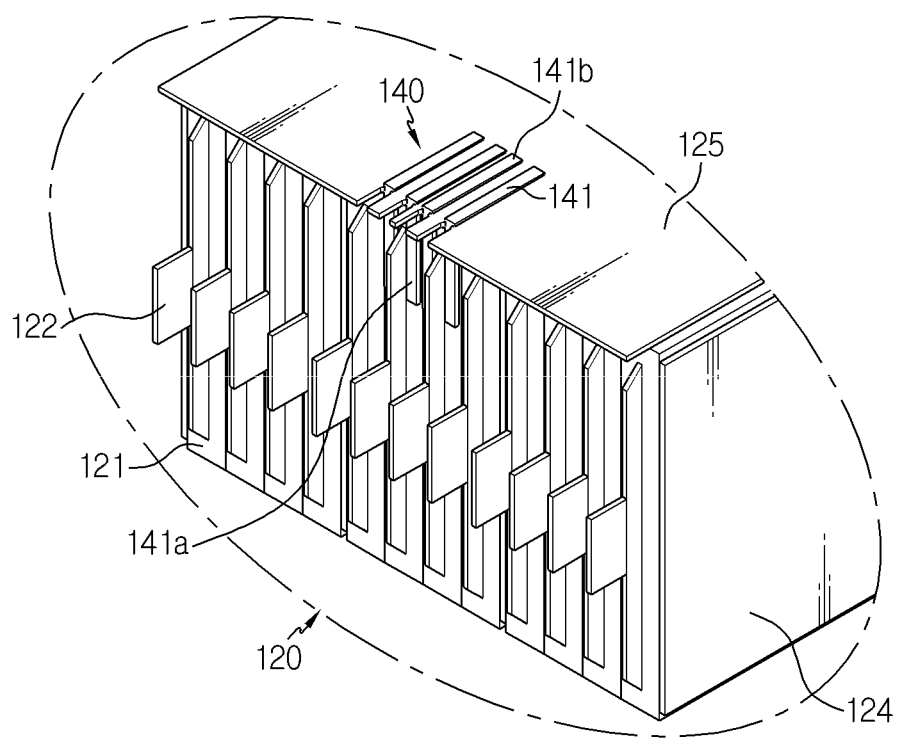
FIG. 3 is an enlarged view of section A of FIG. 2.
Figure 4:
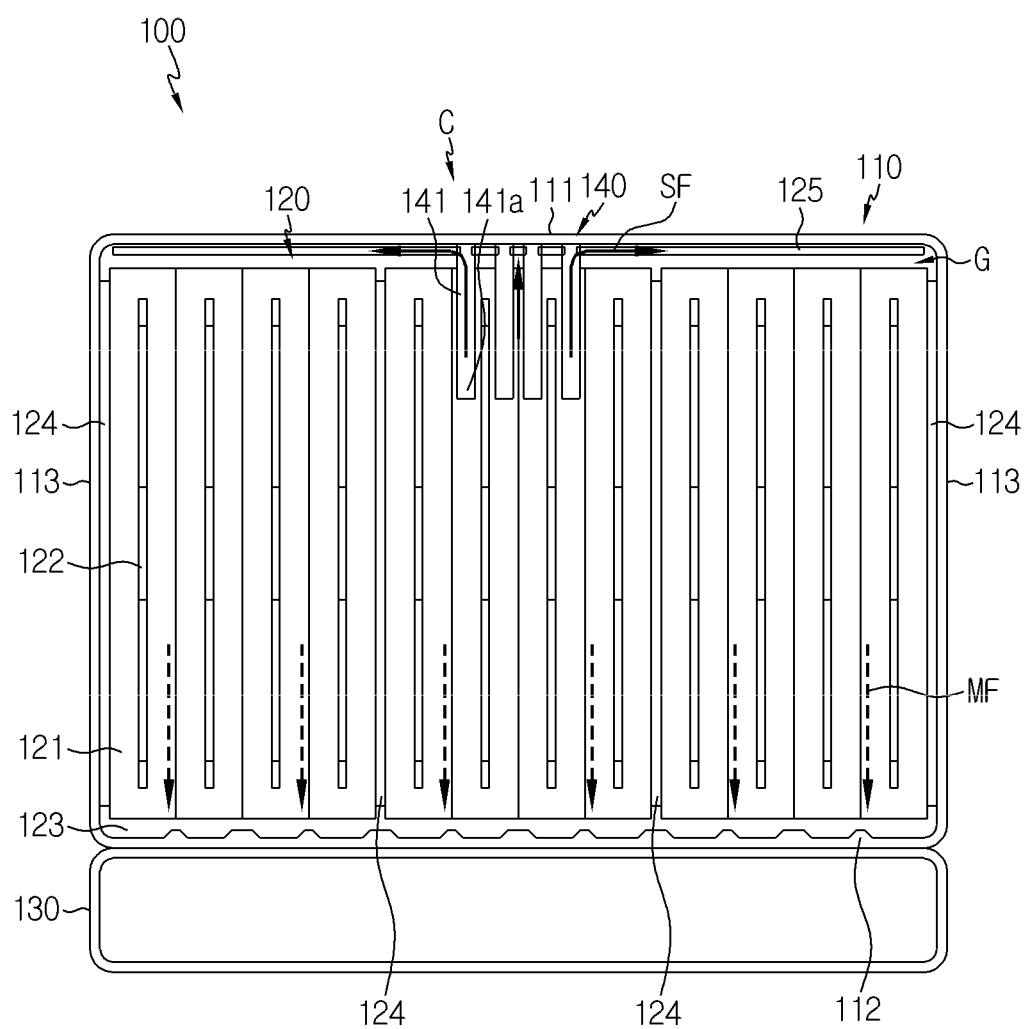
FIG. 4 is a front view of the partially cutaway battery module shown in FIG. 2.

FIG. 2 is a partial cutaway perspective view illustrating a battery module according to an embodiment of the present disclosure. FIG. 3 is an enlarged view of section A of FIG. 2. FIG. 4 is a front view of the partially cutaway battery module shown in FIG. 2.

First, referring to FIG. 2, the battery module 100 includes a module case 110, a battery cell assembly 120, a heat sink 130 and a heat pipe member 140.

The module case 110 forms an external appearance of the battery module 100, and may receive the battery cell assembly 120. To this end, the module case 110 may have a space for receiving the battery cell assembly 120. The module case 110 may come in various types and shapes, and in this embodiment, the module case 110 may include a top plate 111, a bottom plate 112 and a pair of side plates 113. This embodiment shows that the top plate 111, the bottom plate 112 and the side plates 113 are integrally formed, and is described taking it as an example.

Further referring to FIG. 3, in this embodiment, a bump pad 124 may be further provided between the side of the battery cell assembly 120 and the inner side surface of the module case 110, and a top cover 125 may be further provided between the upper surface of the battery cell assembly 120 and the inner upper surface of the module case 110. In FIG. 2, one front side of the module case 110 is cut away to show the battery cell assembly 120, the bump pad 124 and the top cover 125 within the battery module 100 more clearly.

As shown in FIGS. 2 and 3, the battery cell assembly 120 includes two or more battery cells 121. Each battery cell 121 may be a plate-shaped secondary battery. Each battery cell 121 may have an electrode lead 122 drawn to one or two sides. Although this embodiment takes a bidirectional battery having the electrode lead 122 drawn to two sides, i.e., in the opposite directions as an example, the battery cell may be a unidirectional battery having the electrode lead drawn to only one side.

The battery cells 121 may be electrically connected to one another and stacked in the module case 110. In detail, each of the battery cells 121 may be stacked along the horizontal direction of the module case 110 such that an edge where the electrode lead 122 is not drawn is placed downwardly. That is, the battery cells 121 may stand vertically such that the wide surface is not placed on the bottom, and the battery cells 121 may be stacked side by side to form the battery cell assembly 120. In this instance, the electrode lead 122 may be placed on the left side and the right side of the battery cell assembly 120.

As shown in FIGS. 3 and 4, the bump pad 124 can support the battery cell assembly 120 within the module case 110 more stably. At least one pair of bump pads 124 may be provided. The bump pad 124 may be made of an elastic material such as silicone pad. Each of the pair of bump pads 124 are disposed on a respective one of two sides of the inner wall of the module case 110, i.e., inside of the side plates 113, to support two outermost sides of the battery cell assembly 120. The bump pad 124 may be further provided at each predetermined number of battery cells 121. The bump pad 124 plays a role in responding to swelling of the battery cells 121 and preventing the battery cell 121 from being damaged by external impacts.

Referring to FIGS. 2 and 4 together, the heat sink 130 is configured to cool the battery cells 121, and may be mounted on one side of the module case 110. The heat sink 130 uses an edge cooling method and may be mounted below the module case 110 facing the edges of the battery cells 121. The heat sink 130 may have a space in which a vapor or liquid refrigerant may flow, and it may have a metal outer wall that defines the space.

The heat sink 130 is configured to cool an edge of each battery cell 121 where the electrode lead 122 is not drawn (in this embodiment, the bottom edge of each battery cell 121), and the heat sink 130 cools the side of each battery cell 121, not a wide surface, and by this reason, may be called a side cooling type structure. The heat sink 130 is mounted on one side of the battery cell assembly 120 (in this embodiment, the bottom of the battery cell assembly 120), in order to cool one surface of the battery cell assembly 120, i.e., the bottom surface of the battery cell assembly 120.

As shown in FIG. 4, a thermally conductive adhesive 123 may be further included between the inner lower surface of the module case 110 and the lower side of the battery cell assembly 120. The thermally conductive adhesive 123 may fix the edges of the battery cells 121 to the inner lower surface of the module case 110 more stably.

The thermally conductive adhesive 123 is interposed between the inner lower surface of the module case 110, i.e., the upper surface of the bottom plate 112 and the lower side of the battery cell assembly 120. The thermally conductive adhesive 123 is an adhesive for cooling that can conduct heat, and may include thermal resin. There is no limitation on the type of the thermal resin, and for example, may be one of a thermally conductive silicone-based bond, a thermally conductive acrylic bond or a thermally conductive polyurethane bond.

The thermally conductive adhesive 123 may be applied onto the inner lower surface of the module case 110 to stably fix the battery cell assembly 120 onto the inner lower surface of the module case 110 and improve thermal conductivity. The thermally conductive adhesive 123 and the heat sink 130 form a surface cooling structure having a sufficient contact area on the surface where the thermally conductive adhesive 123 and the heat sink 130 are in contact with the battery cell assembly 120. The bottom surface of the battery cell assembly 120 is cooled earlier by the heat sink 130. As described above, the battery module 100 basically has the heat sink 130 below the battery module 100 to cool the lower part of the battery cell assembly 120.

As shown in FIGS. 1 to 4, the heat pipe member 140 is mounted inside the upper side of the module case 110. That is, the heat pipe member 140 is mounted above the battery cell assembly 120 (in this embodiment, on top of the battery cell assembly 120), opposite the heat sink 130 mounted below the module case 110. Preferably, the heat pipe member 140 thermally contacts the inner upper side of the module case 110, i.e., the top plate 111.

Figure 5:
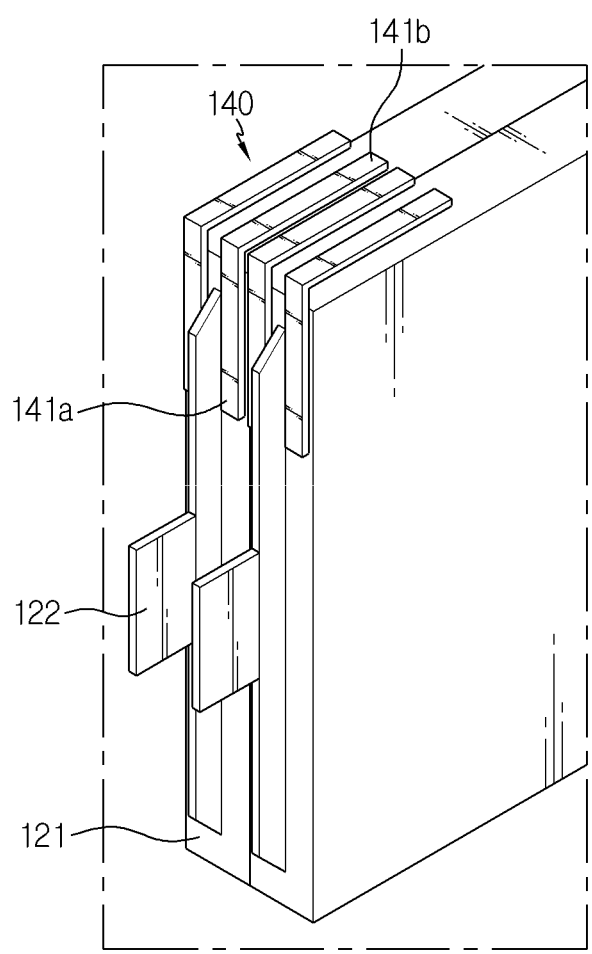
FIG. 5 shows a partial perspective view of battery cells and a heat pipe member of FIG. 2.
Figure 6:
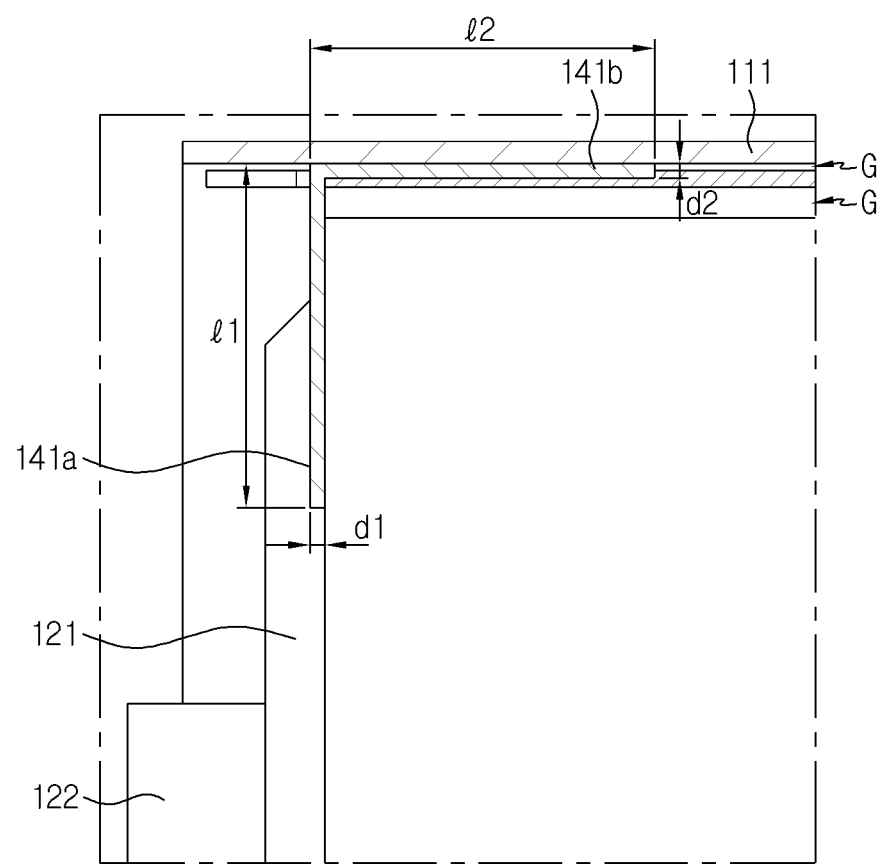
FIG. 6 is an enlarged side view of a heat pipe member of FIG. 2.

FIG. 5 shows a partial perspective view of the battery cells and the heat pipe member of FIG. 2. FIG. 6 is an enlarged side view of the heat pipe member of FIG. 2.

In FIGS. 1 to 6, the heat pipe member 140 uses a "thin fluid-filled heat pipe loop", and has a structure that causes a phase change of the refrigerant and spontaneous circulation of the refrigerant. The heat pipe member 140 may include a plurality of strip-shaped heat pipes 141.

The heat pipe 141 includes the refrigerant in a sealed case. The refrigerant is not forcibly circulated by a pump, and the refrigerant is spontaneously vaporized by heat generated from the battery cell 121 and condenses and circulates there. The refrigerant includes any type of refrigerant used in a cooler without limitation. The refrigerant may include, for example, ammonia, acetone, methanol and ethanol, and water may be used. Additionally, the heat pipe 141 may further include therein a structure such as a wick to provide a movement path of the refrigerant.

As clearly shown in FIG. 5, in each heat pipe 141, on one side of the heat pipe 141, preferably an evaporator 141a is formed on the side of the electrode lead 122 of the battery cell 121, and on the other side the heat pipe 141, preferably a condenser 141b is applied to the side of the top of the battery cell 121. In particular, the heat pipe 141 may be in contact with the inner surface of the module case 110 on the upper side of the battery module 100, i.e., the top plate 111, to form a heat transfer pathway to the top of the module case 110. For this configuration, each heat pipe 141 may be bent, for example, in the shape of ¬ (i.e., two linear segments joined at a right angle).

In this embodiment, the heat pipe 141 uses a "liquid-cooling system" of closed structure, thereby eliminating the need to add a separate refrigerant pump to the battery module 100. Accordingly, this cooling method does not need for mechanical operation as opposed to the forcible circulation method. The refrigerant is continuously provided from the condenser 141b to the evaporator 141a by the capillary force while circulating between the evaporator 141a and the condenser 141b, and vapor generated by a heat source of the evaporator 141a (the electrode lead 122 of the battery cell 121) moves to the condenser 141b and returns to a liquid.

The heat pipe 141 may be manufactured with a very small thickness, its structure may be designed to fit to a target application, and thus it is easy to be mounted in the battery module 100. In FIG. 6, it is possible to form a structure that is thin, and for example, the heat pipe 141 may be a minimum of 0.6 mm in thickness d1 at the evaporator 141a, and may be a minimum of 1.0 mm in thickness d2 at the condenser 141b, and it may be formed with a structure that is lightweight and has a high degree of freedom of design. The heat pipe 141 may be, for example, 30 mm in length l1 at the evaporator 141a, and may be, for example, 30 mm in length l2 at the condenser 141b. The heat pipe 141 is small and has good cooling effect. As the refrigerant goes through evaporation and condensation while moving in the closed circuit within the heat pipe 141, the heat pipe 141 effectively dissipates heat concentrated on the top left/right ends of the battery cell 121 through the module case 110. As shown in FIG. 4, a pathway (bridge), i.e., an additional heat transfer pathway SF through which heat goes up from the top left/right ends of the battery cell 121 through the upper side of the module case 110 is formed to reduce safety and durability risks caused by the increasing temperature difference in the battery cell 121.

Figure 7A:
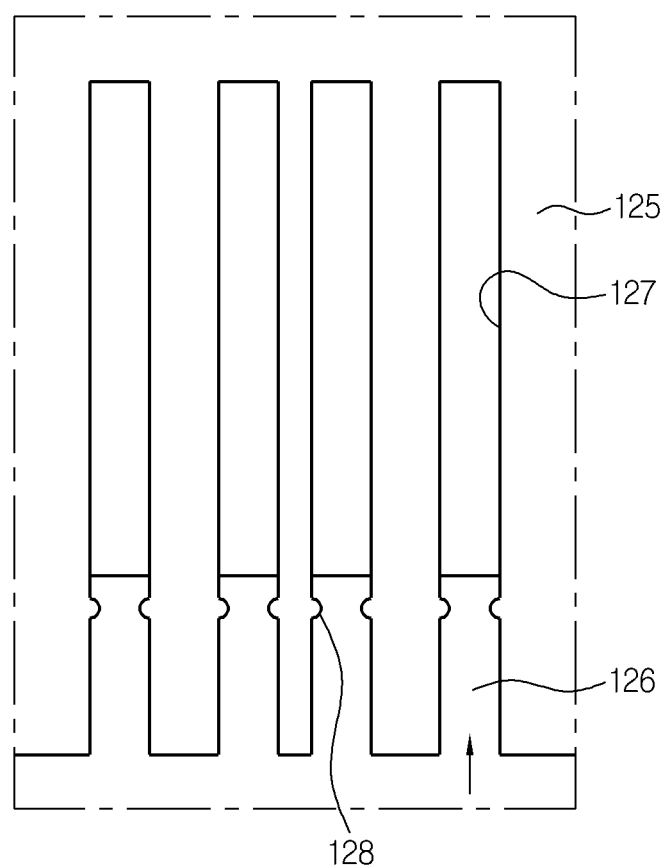
FIG. 7a shows a top cover part of FIG. 2.

Various embodiments are possible to facilitate the application of the heat pipe member 140 to the battery module 100. In particular, in this embodiment, the heat pipe member 140 is assembled into the top cover 125 and mounted in the battery module 100 to form a heat transfer pathway from the heat pipe member 140 to the module case 110. FIG. 7a shows the top cover of FIG. 2.

Figure 7B:
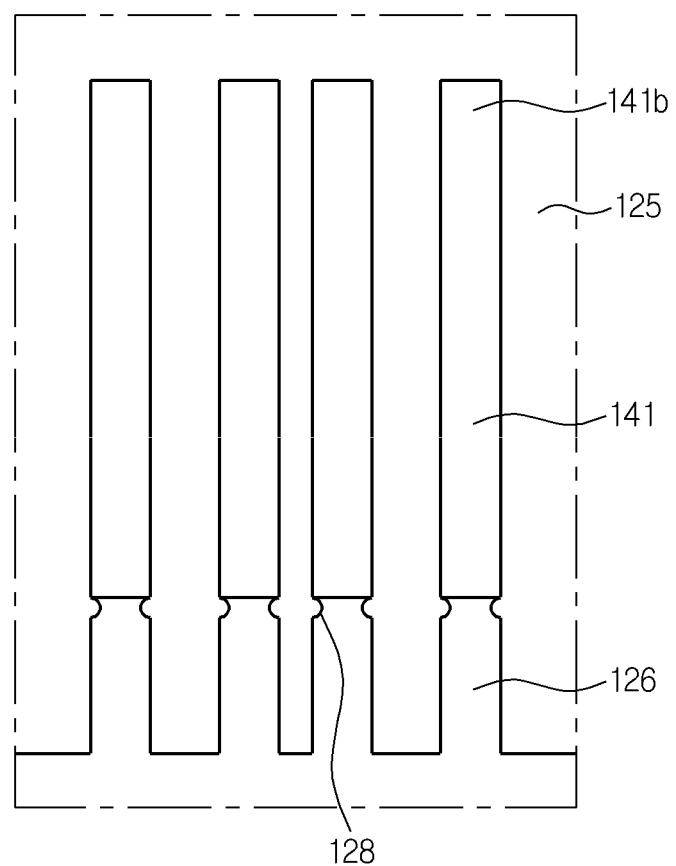

As shown in FIG. 7a, the top cover 125 has an insertion hole 126 for inserting the heat pipe 141 and a seating groove 127 for seating the condenser 141b of the heat pipe 141. In the assembling, when the heat pipe 141 is inserted into the insertion hole 126 in the direction of the arrow and the condenser 141b is positioned in the seating groove 127, the heat pipe 141 is assembled into the top cover 125. FIG. 7b is a top view of the heat pipe 141 of the heat pipe member 140, in particular, the condenser 141b, assembled into the top cover of FIG. 7a.

In this instance, an interference fit structure may be used. Additionally, a protrusion 128 is formed on two sides of the insertion hole 126 at the location where the heat pipe 141 is bent in the shape of ¬, to form a structure for firmly fixing the heat pipe 141. As can be seen in FIG. 7a, the protrusion 128 and the seating groove 127 may be spaced apart from each other to form a space for assembling the heat pipe member 140. When the heat pipe member 140 is assembled thereon, as shown in FIG. 7b, the heat pipe 141 of the heat pipe member 140, in particular, the condenser 141b, may be in contact with the protrusion 128, and the evaporator 141a may be formed on the side of the electrode lead 122 of the battery cell 121.

As described above, when the heat pipe member 140 including the heat pipe 141 is assembled and mounted in the top cover 125, it is possible to firmly fix the heat pipe member 140, prevent the movement to the incorrect location caused by impacts and maintain the battery module 100 more firmly.

As described above, in this embodiment, the heat pipe member 140 is assembled on the side of the top cover 125, and in this instance, the condenser 141b is seated between the top cover 125 and the module case 110 to form a heat transfer pathway to the top.

The top cover 125 may be a general plastic material or an engineering plastic material with higher thermal conductivity than the general plastic material, and thermal conductivity may be lower than the module case 110 of a metal material. As clearly shown in FIGS. 4 and 6, a gap G may be formed between the upper surface of the battery cell assembly 120 and the top cover 125. Since a separate component (not shown) such as a voltage sensing line is disposed above the battery cell assembly 120, a space for the component is necessary, and it is desirable to form the gap G so as to cope with swelling of the battery cell 121 while the battery module 100 is in use. However, an air gap present in the gap G may provide a thermal insulation effect.

Since the electric current becomes concentrated near the electrode lead 122, much heat is generated from the battery cell 121. The heat generated from the battery cell 121 tends to be dissipated in all directions, but the air gap present in the gap G and the top cover 125 block the heat, and thus heat dissipation to the top of the battery cell assembly 120 may be difficult. Accordingly, a heat transfer pathway MF is formed toward the bottom of the battery cell assembly 120 by the heat sink 130 as indicated by the arrow in FIG. 4, and tendency toward dissipation through the bottom of the module case 110 via the thermally conductive adhesive 123 is dominant. The present disclosure further includes the heat pipe member 140. When there is no heat pipe member 140, the heat transfer pathway MF of the battery cell assembly 120 is only formed toward the bottom of the battery module 100, but the present disclosure includes the heat pipe member 140 on top of the battery cell assembly 120, and as shown in FIG. 4, the heat transfer pathway SF of the battery cell assembly 120 is also formed toward the top of the battery module 100. The present disclosure introduces the heat pipe member 140 on top of the battery cell assembly 120 and connects the heat pipe member 140 to the module case 110, and thus has a good effect of heat transfer from the battery cell assembly 120 to the module case 110 across the air gap having the thermal insulation effect. In the battery module 100 of the present disclosure, the heat pipe member 140 connected to the module case serves as a heat transfer bridge.

If there is no heat pipe member 140, only the lower part of the battery cell assembly 120 is cooled by the heat sink 130, and thus a temperature difference between top and bottom of the battery cell assembly 120 will increase. The present disclosure further includes the heat pipe member 140 to reduce a temperature difference between one surface and the other surface of the battery cell assembly 120, i.e., a temperature difference between bottom and top, or a temperature difference between the lower surface and the upper surface.

The heat pipe member 140 may be applied to an area that is difficult to be cooled by the heat sink 130, i.e., the upper surface of the battery cell assembly 120, in particular, a central part C where heat generation is severe. The heat pipe member 140 may be a single integrated plane-type heat pipe without including the plurality of strip-shaped heat pipes 141 as shown. Various embodiments of the heat pipe member 140 will be described below. In addition to the assembly used in this embodiment, various embodiments are possible to facilitate the application of the heat pipe member 140 to the battery module 100, and its description will be provided below.

The present disclosure is not limited to the type of the battery cell 121 included in the battery cell assembly 120, the number of battery cells 121 and the connection method, and the type of the module case 110 and its assembly method, but the battery cell 121 may be, in particular, a pouch-type battery cell as shown in FIG. 1, and the module case 110 may include a tubular rectangular monoframe. Hereinafter, the present disclosure will be described in more detail by describing the module case 110 and the assembly method of the battery module 100.

Referring back to FIG. 2, the module case 110 has at least one open surface, through which the battery cell assembly 120 is inserted. The module case 110 may be provided in a rectangular parallelepiped shape as a whole. For example, the module case 110 may be provided in a tubular rectangular shape with two opposing open sides. The module case 110 is made of a thermally conductive material to absorb heat of the battery cell assembly 120 and dissipate the heat. The module case 110 may be made of a metal material. Because metal material has good thermal conductivity, it is possible to perform the heat radiation function as a whole. For the material of the module case 110, all metal materials may be used, and when considering thermal conductivity, processing and cost, it is desirable to use SUS- or aluminum-based materials. The use of aluminum-based materials is more advantageous for light weight.

The module case 110 may include the top plate 111 to cover the top of the battery cell assembly 120. To this end, the top plate 111 may have a sufficient size and shape to cover the top of the battery cell assembly 120. The module case 110 may include the bottom plate 112 opposite the top plate 111 to cover the bottom of the battery cell assembly 120. The bottom plate 112 is provided with generally the same shape as the top plate 111, and can stably support the battery cell assembly 120. The module case 110 may include the pair of side plates 113 coupled with the top plate 111 and the bottom plate 112 and disposed on two sides of the battery cell assembly 120. The pair of side plates 113 may have the same shape and size, facing each other.

As described above, the module case 110 includes the top plate 111, the bottom plate 112 and the side plates 113, and has a first opening OA and a second opening OB on two sides of the lengthwise (L in FIG. 1) direction of the battery cell 121. The top plate 111, the bottom plate 112 and the side plates 113 may be connected to one another by welding. In an example, the top plate 111, the bottom plate 112 and the side plates 113 may be welded on the sides by friction stir welding such that their ends do not overlap and their edges come into contact with one another. In another example, the top plate 111, the bottom plate 112 and the side plates 113 may be bonded to one another, may be integrally formed, or may be coupled together with a hinge structure. As described above, the module case 110 may be a monoframe.

A guide structure may be further formed on the upper surface of the bottom plate 112 to insert and fix the battery cell assembly 120. The guide structure and the battery cell assembly 120 may be coupled by a sliding method. That is, part of the battery cell assembly 120 may be inserted and coupled to the guide structure. For example, the edge of the battery cell 121 may be inserted into the guide structure. The guide structure may be provided in the shape of a groove in multiple numbers. The guide structure may be provided in the corresponding number to the number of battery cells 121. When the battery cell 121 is inserted into the guide structure, it is possible to support the battery cell 121 more stably.

In the assembly process, the battery cell assembly 120 is received in the module case 110 through the first opening OA of the module case 110. In this instance, the battery cell assembly 120 may be received in the module case 110 with the thermally conductive adhesive 123 described with reference to FIG. 4 being applied below the battery cell assembly 120, and after the assembly process is completed, the thermally conductive adhesive 123 may be injected into the module case 110.

The battery module 100 may further include other additional components of the battery module, for example, a sensing assembly. The electrode lead 122 of the battery cells 121 may be electrically connected to the sensing assembly. The sensing assembly may cover the front and rear sides of the battery cell assembly 120. The sensing assembly may be electrically connected to the battery cell assembly 120 to sense the voltage or temperature of the battery cell assembly 120. Additionally, the sensing assembly may be connected to an external power source. The sensing assembly plays a role in transmitting sensing information about the electrical properties of the battery cell assembly 120 such as voltage to other devices (not shown) outside of the battery module 100. For example, a Battery Management System (BMS) may be connected to the battery module 100 to control the operation of the battery module 100 such as charging or discharging. In this instance, the sensing assembly may be connected to the BMS to provide the sensed voltage information of the battery cell assembly 120 to the BMS, and the BMS may control the battery module 100 based on the information.

After the battery cell assembly 120 is received in the module case 110, a front cover (not shown) is coupled to the first opening OA of the module case 110 and covers the front side of the battery cell assembly 120. The front cover may form a front side of the battery module 100. After the battery cell assembly 120 is received in the module case 110, a rear cover (not shown) is coupled to the second opening OB of the module case 110 and covers the rear side of the battery cell assembly 120. The rear cover may form a rear side of the battery module 100.

As described above, the front cover and the rear cover are placed on the front and rear sides of the top plate 111 and the bottom plate 112 to cover the front and rear sides of the battery cell assembly 120. The front cover and the rear cover may be welded or bonded to the module case 110. Alternatively, the front cover and the rear cover may be detachably coupled to the module case 110.

As described above, the battery module 100 may use the tubular rectangular monoframe type module case 110, not the conventional cell cartridge. Due to not using the cell cartridge to which the edge of the battery cell is inserted and fixed by press-fit as conventionally, the allowance in the design of the entire battery module 100 increases, and it is possible to solve the conventional problem with the transmission, to the edge of the battery cell, of impacts or vibration which may occur during mounting when the edge of the battery cell is inserted into the cell cartridge. The battery module 100 and the battery pack including the same can protect the battery cell from external vibration very well, and thus they are advantageous in the application of vehicles that are frequently exposed to external vibration.

Additionally, the battery module 100 is completed by receiving the battery cell assembly 120 through the opening of the module case 110, followed by a simple operation of closing the openings on two sides. As described above, assembly of the battery module 100 can be easily performed, resulting in high process efficiency. Additionally, the battery module 100 may not include a sealing component such as an O-ring, a cooling component such as a cooling fin, or a reinforcing or fixing component such as a cartridge, thus reducing the number of components of the battery module 100. Accordingly, it is possible to reduce the production cost and time and the weight, thereby improving productivity of the battery module 100.

Figure 8:
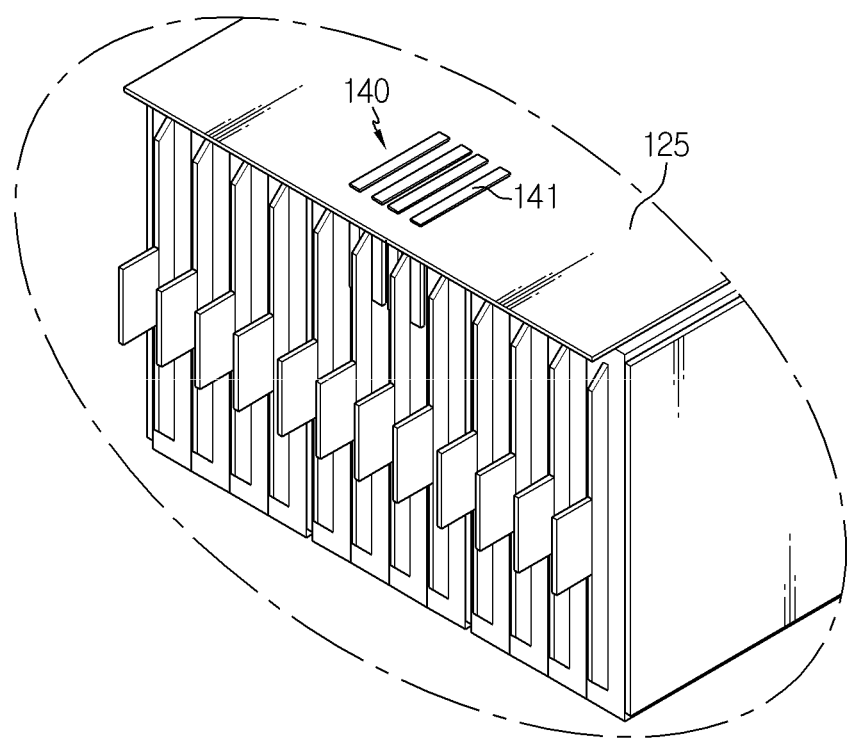
FIG. 8 is a perspective view illustrating an embodiment of inserting a heat pipe member.

The second embodiment of the method of introducing the heat pipe 141 into the battery module 100 proposes a structure in which a plurality of heat pipes 141 is inserted into the top cover 125. FIG. 8 is a perspective view illustrating an embodiment of inserting the heat pipe member. When manufacturing the top cover 125, the heat pipe 141 may be inserted into the top cover 125 through a method such as insert molding to manufacture an integrated structure, and this may be used when assembling the battery module 100. Also in this embodiment, the heat pipe 141 is bent in the shape of ¬, and a portion of the bent part is placed on the top cover 125 and contacts the module case 110, and other portion is placed on the side of the electrode leads of the battery cells within the battery cell assembly 120.

Figure 9:
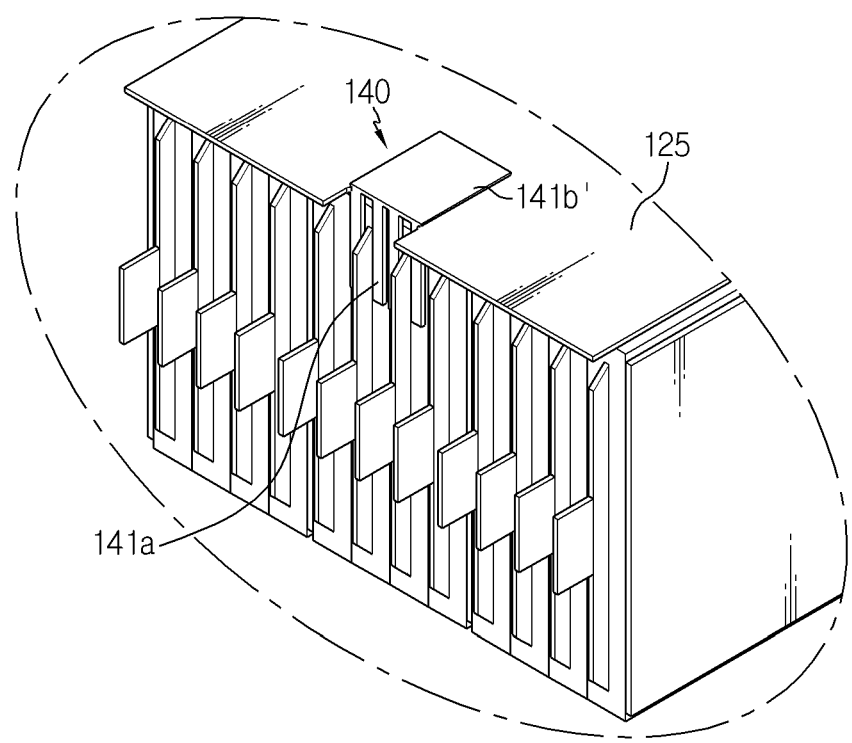
FIG. 9 is a perspective view illustrating an embodiment in which a heat pipe member is formed as one block.
Figure 10:
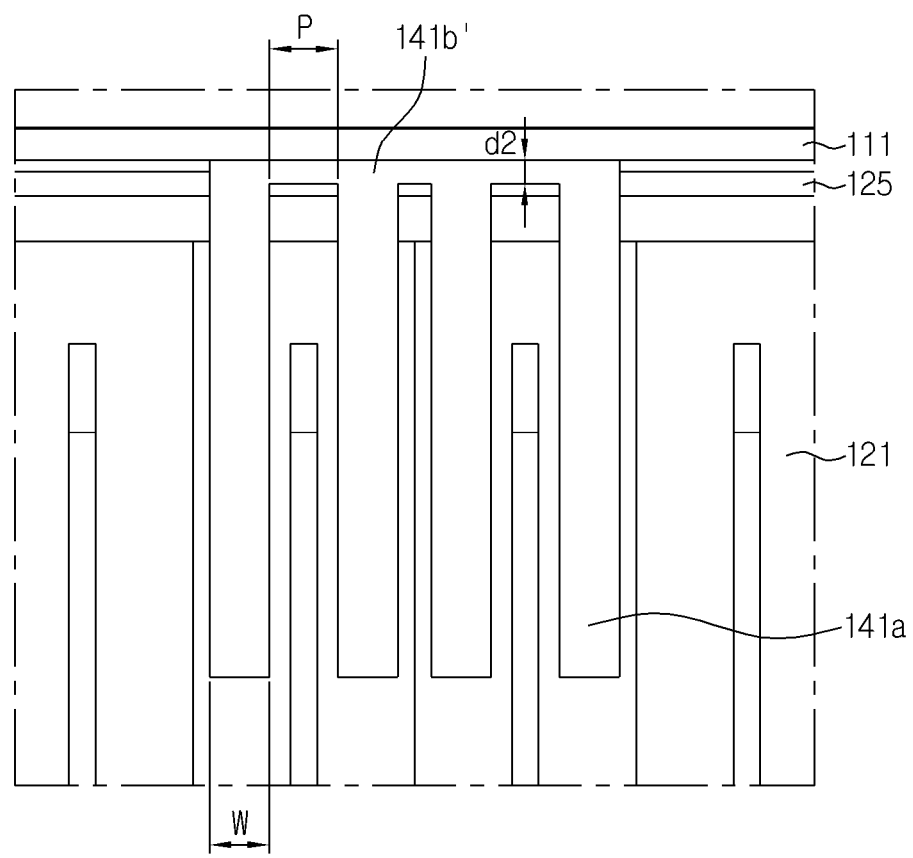
FIG. 10 is a front view of a battery module to which the embodiment of FIG. 9 is applied.
Figure 11:
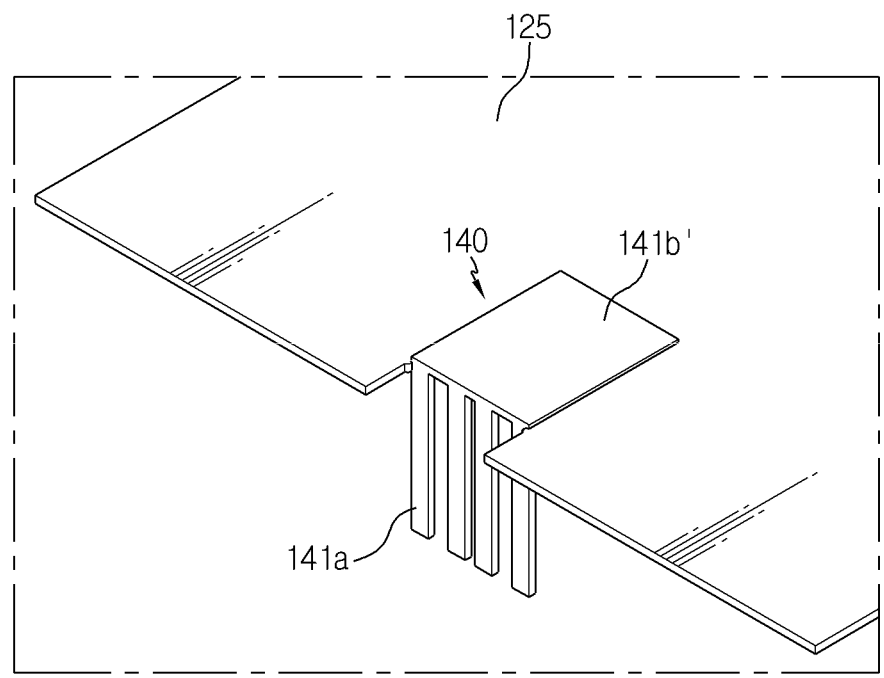
FIG. 11 is a perspective view showing a top cover including the heat pipe member of FIG. 9.
Figure 12:
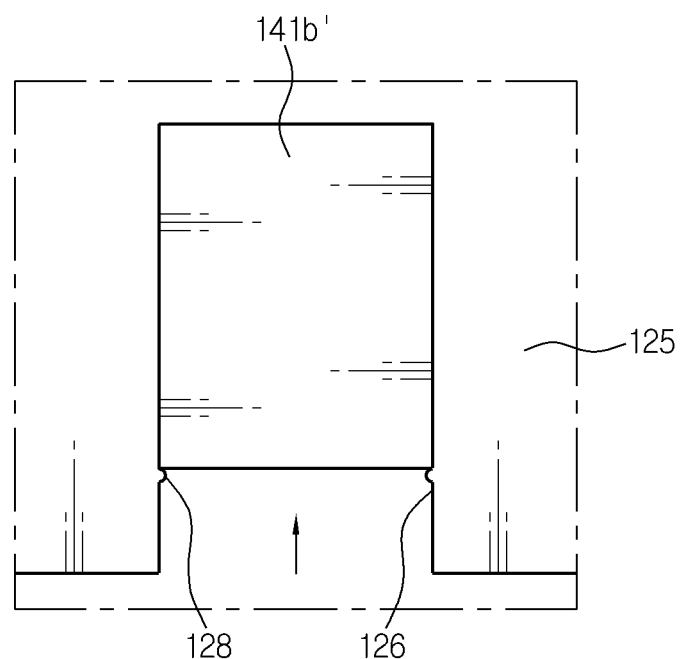
FIG. 12 is a top view showing a top cover including the heat pipe member of FIG. 9.

The third embodiment proposes a structure in which the heat pipe is modularized (as a block) and assembled into the top cover 125. FIG. 9 is a perspective view illustrating an embodiment in which the heat pipe member is formed as one block. FIG. 10 is a front view of the battery module to which the embodiment of FIG. 9 is applied. FIG. 11 is a perspective view showing the top cover including the heat pipe member of FIG. 9. FIG. 12 is a top view showing the top cover including the heat pipe member of FIG. 9.

Referring to FIGS. 9 to 12, the heat pipe member 140 includes the evaporator 141*a* in the shape of strips, and the condenser 141*b'* of an integrated heat pipe module. The heat pipe member 140 may be, for example, 4 mm in width w at the evaporator 141*a*. A distance p between the evaporators 141*a* may be, for example, 1.5 mm. The heat pipe member 140 may be a minimum of 1.0 mm in thickness d2 at the condenser 141*b'*.

As shown in FIG. 12, the top cover 125 has the insertion hole 126 for inserting the heat pipe condenser 141*b'* and the seating groove for seating the heat pipe condenser 141*b'* (in the same way as 127 in FIG. 7*a*). In assembly, when the heat pipe condenser 141*b'* is inserted into the insertion hole 126 in the direction of the arrow and the condenser 141*b'* is positioned in the seating groove, the heat pipe member 140 is assembled into the top cover 125. In this instance, an interference fit structure may be used. Additionally, the protrusion 128 is formed on two sides of the insertion hole 126 at the location where the heat pipe member 140 is bent in the shape of ¬, to form a structure for firmly fixing the heat pipe member 140.

As in the embodiments described with reference to FIG. 2 to FIGS. 7*a* and 7*b*, an example is shown in which the heat pipe member 140 is assembled into the top cover 125, but also as in the embodiment described with reference to FIG. 8, the heat pipe member 140 may be inserted into the top cover 125.

In the embodiments described hereinabove, the basic structure of cooling the lower side of the battery cell assembly 120 through the thermally conductive adhesive 123 or the heat sink 130 can also achieve cooling of the upper side through the heat pipe member 140. According to the present disclosure, cooling through the upper side of the battery cell assembly 120 is possible, and thus it is easy to design devices using the battery module 100 or respond to design changes, and when cooling performance through the lower side of the battery cell assembly 120 is insufficient, it is possible to improve the cooling performance.

In particular, as mentioned in FIG. 1, the present disclosure can solve the problem with a temperature increase at the top left/right ends of the battery cell with the increasing length of the battery cell and its consequential large temperature difference between different locations in the battery cell. Since the temperature difference increase problem is prevented, it is possible to improve the safety and durability of the battery module 100 including the same.

As described above, the present disclosure provides a battery module 100 of simple and compact design that does not make the entire structure complex and does not occupy a large space, and prevents a temperature difference from occurring between top and bottom of the battery cell assembly 120. The present disclosure further provides a battery pack including the battery module 100 and a vehicle including the battery pack.

Figure 13:
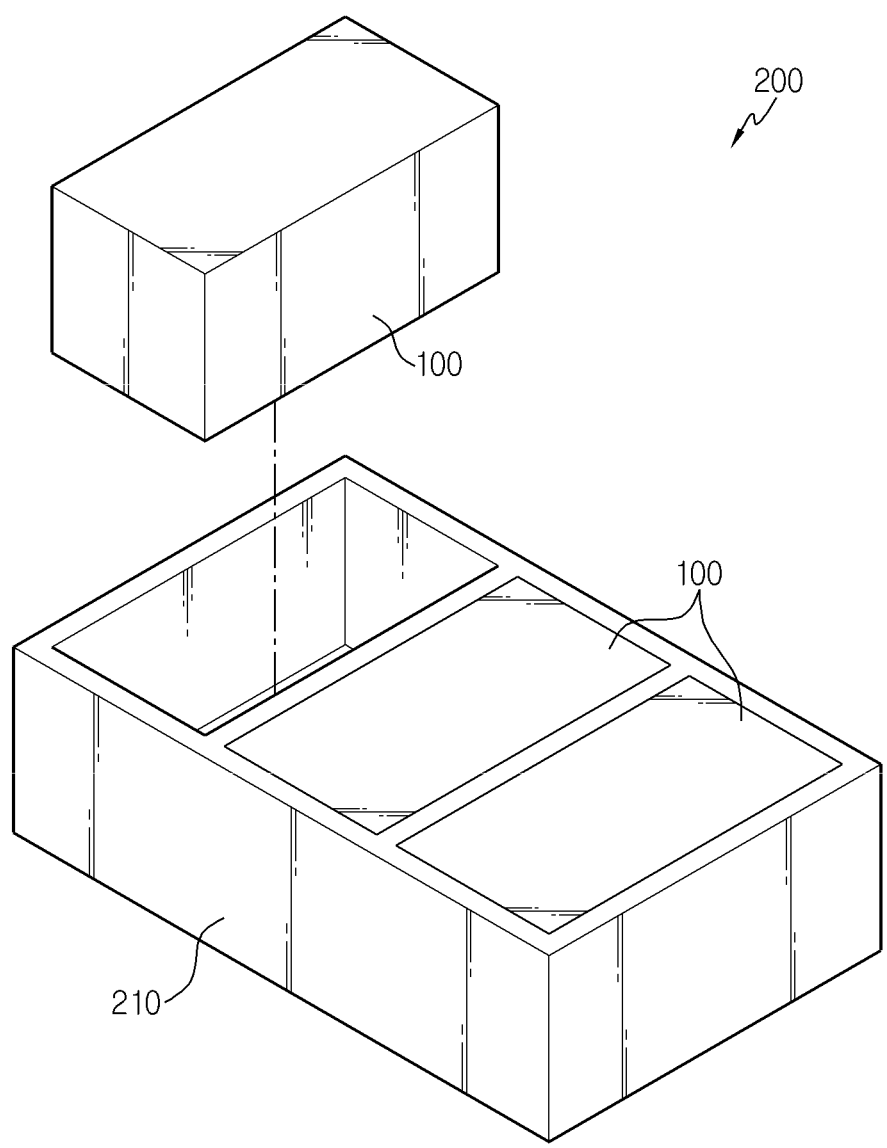
FIG. 13 is a diagram illustrating a battery pack according to an embodiment of the present disclosure.
Figure 14:
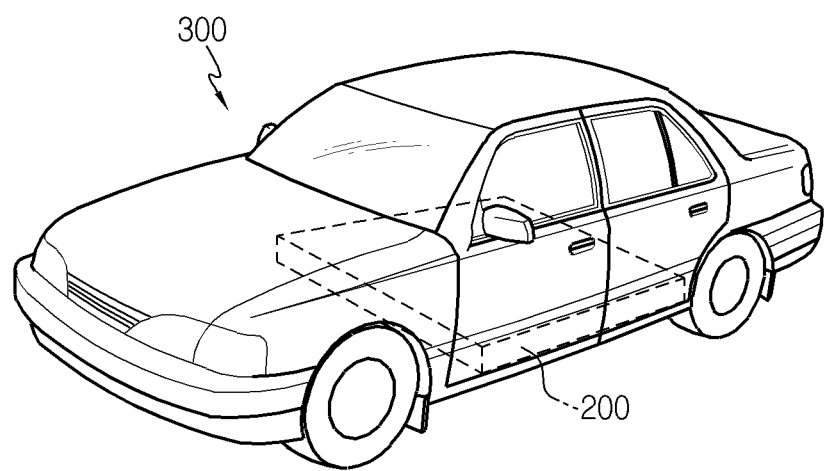
FIG. 14 is a diagram illustrating a vehicle according to an embodiment of the present disclosure.

FIG. 13 is a diagram illustrating the battery pack according to an embodiment of the present disclosure. FIG. 14 is a diagram illustrating the vehicle according to an embodiment of the present disclosure.

Referring to FIGS. 13 and 14, the battery pack 200 may include at least one battery module 100 according to the previous embodiment and a pack case 210 to package the at least one battery module 100. Additionally, in addition to the battery module 100 and the pack case 210, the battery pack 200 according to the present disclosure may further include various types of devices for controlling the charge/discharge of the battery module 100, for example, a BMS, a current sensor and a fuse.

The battery pack 200 may be provided in the vehicle 300 as a fuel source of the vehicle 300. For example, the battery pack 200 may be provided in the vehicle 300 such as an electric vehicle, a hybrid electric vehicle and other applications using the battery pack 200 as a fuel source.

Preferably, the vehicle 300 may be an electric vehicle. The battery pack 200 may be used as an electrical energy source to supply power to a motor of the electric vehicle 300 to drive the vehicle. In this case, the battery pack 200 has high nominal voltage of 100V or more.

The battery pack 200 may be charged or discharged by the inverter by the operation of the motor and/or the internal combustion engine. The battery pack 200 may be charged by the regenerative charger coupled to the brake. The battery pack 200 may be electrically connected to the motor of the vehicle 300 through the inverter.

As described above, the battery pack 200 includes a BMS. The BMS predicts the state of the battery cells in the battery pack 200, and manages the battery pack 200 using the predicted state information. For example, the BMS predicts and manages the state information of the battery pack 200 such as State Of Charge (SOC), State Of Health (SOH), maximum allowable input/output power and output voltage of the battery pack 200. Additionally, the BMS controls the charge or discharge of the battery pack 200 using the state information, and besides, may estimate when to replace the battery pack 200.

The ECU is an electronic control device to control the state of the vehicle 300. For example, the ECU determines torque information based on information of the accelerator, the brake and the speed, and controls the output of the motor according to the torque information. Additionally, the ECU transmits a control signal to the inverter to allow the battery pack 200 to be charged or discharged based on the state information of the battery pack 200 including SOC and SOH received by the BMS. The inverter allows the battery pack 200 to be charged or discharged based on the control signal of the ECU. The motor drives the vehicle 300 based on the control information (for example, torque information) received from the ECU using electrical energy of the battery pack 200.

The vehicle 300 includes the battery pack 200 according to the present disclosure, and as described above, the battery pack 200 may prevent the problem with a temperature increase at the top left/right ends of the battery cell with the increasing length of the battery cell and its consequential temperature difference between different locations in the battery cell. Accordingly, the battery pack 200 and the vehicle 300 including the same have improved safety and durability. Additionally, since the top cover is used to fix the heat pipe member, there is no likelihood that the fixed location is moved by external impacts. Accordingly, the structural stability of the battery pack 200 is maintained against vibrations applied to the battery pack 200 during driving of the vehicle 300, or impacts applied to the battery pack 200 in the event of collision of the vehicle 300, and external forces during the use of the vehicle 300 including the battery pack 200. Additionally, the battery pack 200 has good safety and long-term use, and thus the vehicle 300 including the same is safe and easy to operate.

Additionally, it is obvious that the battery pack 200 may be provided in any other device, apparatus and equipment other than vehicle 300, such as Energy Storage Systems using secondary batteries.

The battery pack 200 according to this embodiment and the device, apparatus and equipment including the battery pack 200, such as the vehicle 300, include the above-described battery module 100, and thus it is possible to implement the battery pack 200 having all the above-described advantages of the battery module 100 and the device, apparatus and equipment, such as the vehicle 300, including the battery pack 200.

According to various embodiments as described above, it is possible to provide the battery module 100 with larger volume of the battery cells and more compact size and reduce a temperature difference between top and bottom of the battery cell assembly, the battery pack 200 including the battery module 100 and the vehicle 300 including the battery pack 200.

Meanwhile, the terms indicating directions as used herein such as upper, lower, front and rear are used for convenience of description, and it is obvious to those skilled in the art that the term may change depending on the position of the stated element or an observer.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

What is claimed is:

1. A battery module comprising:
    a module case;
    a battery cell assembly that is received in the module case, the battery cell assembly including a plurality of battery cells, wherein each of the battery cells has a plurality of electrode leads extending from one or two sides of the respective battery cell, the battery cells being stacked along a first dimension of the module case such that a first edge of each of the battery cells not having any of the plurality of electrode leads is oriented along a second dimension orthogonal to the first dimension;
    a heat sink mounted adjacent to a first side of the module case along the second dimension, facing the first edges of the battery cells; and
    a heat pipe member mounted inside a second side of the module case opposite to the first side along the second dimension, the heat pipe member defining a sealed case containing a refrigerant, the refrigerant not being forcibly circulated within the sealed case of the heat pipe member by any mechanical device,
    wherein the heat pipe member includes an evaporator and a condenser, the evaporator is formed alongside of the electrode leads of the battery cells, and the condenser is in contact with an inner surface of the module case.

2. The battery module according to claim 1, further comprising:
    a thermally conductive adhesive interposed between an inner surface of the module case at the first side and a first side of the battery cell assembly adjacent the first side of the module case.

3. The battery module according to claim 1, wherein the module case further includes:
    a second plate that covers a second side of the battery cell assembly adjacent the second side of the module case;
    a first plate disposed opposite the second plate, the first plate covering the first side of the battery cell assembly adjacent the first side of the module case;
    a pair of side plates that are coupled to the first plate and the second plate, the pair of side plates being disposed on respective third and fourth sides of the battery cell assembly, the third and fourth sides being opposite one another in the first dimension;
    a first opening and a second opening that are open to respective fifth and sixth sides of the battery cell assembly, the fifth and sixth sides being opposite one another in a third dimension orthogonal to both the first and second dimensions; and a first cover that is coupled to the first opening of the module case and covers the fifth side of the battery cell assembly, and a second cover that is coupled to the second opening of the module case and covers the sixth side of the battery cell assembly.

4. The battery module according to claim 1, further comprising:
a cover between the second side of the module case and the battery cell assembly,
wherein the heat pipe member is mounted to the cover.

5. The battery module according to claim 4, wherein the heat pipe member is positioned within the cover.

6. The battery module according to claim 4, wherein the heat pipe member is mounted to the cover by an interference fit.

7. The battery module according to claim 1, wherein the heat pipe member includes a plurality of strip-shaped heat pipes.

8. The battery module according to claim 1, wherein the evaporator is defined by a plurality of strip-shaped heat pipes connected to a single integrated heat pipe module that defines the condenser.

9. A battery pack comprising:
at least one battery module according to claim 1; and
a pack case that is configured to receive the at least one battery module.

10. A vehicle comprising at least one battery pack according to claim 9.

11. The battery module according to claim 1, wherein the evaporator is oriented orthogonally to the condenser.

* * * * *